United States Patent
Keech

(10) Patent No.: US 7,039,529 B2
(45) Date of Patent: May 2, 2006

(54) CONSUMPTION METER

(75) Inventor: Ray Keech, Stroud (GB)

(73) Assignee: ABB Limited, Stonehouse (GB)

( * ) Notice: Subject to any disclaimer, the term of this patent is extended or adjusted under 35 U.S.C. 154(b) by 0 days.

(21) Appl. No.: 10/678,749

(22) Filed: Oct. 6, 2003

(65) Prior Publication Data

US 2004/0128084 A1 Jul. 1, 2004

(30) Foreign Application Priority Data

Oct. 7, 2002 (GB) .................................. 0223238

(51) Int. Cl.
*G01F 1/00* (2006.01)

(52) U.S. Cl. .......................... 702/45; 702/51
(58) Field of Classification Search .................. 702/51, 702/50, 33, 45–49; 73/40, 37, 40.5 R, 49.1, 73/49.5, 137, 15.11; 340/870.02, 870.01, 340/870.07, 870.09; 379/106.03, 106.01, 379/90.01
See application file for complete search history.

(56) References Cited

U.S. PATENT DOCUMENTS

| | | | | |
|---|---|---|---|---|
| 5,404,136 | A * | 4/1995 | Marsden | 340/870.03 |
| 5,572,438 | A | 11/1996 | Ehlers et al. | |
| 5,748,104 | A * | 5/1998 | Argyroudis et al. | 340/870.11 |
| 5,892,758 | A * | 4/1999 | Argyroudis | 370/335 |
| 6,088,659 | A * | 7/2000 | Kelley et al. | 702/62 |
| 6,246,677 | B1 * | 6/2001 | Nap et al. | 370/346 |
| 6,311,105 | B1 * | 10/2001 | Budike, Jr. | 700/291 |
| 6,363,057 | B1 * | 3/2002 | Ardalan et al. | 370/252 |
| 6,396,839 | B1 * | 5/2002 | Ardalan et al. | 370/401 |
| 6,553,336 | B1 * | 4/2003 | Johnson et al. | 702/188 |
| 6,556,142 | B1 * | 4/2003 | Dunstan | 340/606 |
| 6,583,720 | B1 * | 6/2003 | Quigley | 340/521 |
| 6,622,097 | B1 * | 9/2003 | Hunter | 702/61 |
| 6,747,981 | B1 * | 6/2004 | Ardalan et al. | 370/401 |
| 2002/0010690 | A1 | 1/2002 | Howell et al. | |

FOREIGN PATENT DOCUMENTS

| | | |
|---|---|---|
| EP | 1221683 A2 * | 7/2002 |
| JP | A-9053954 | 2/1997 |
| JP | A-2000314752 | 11/2000 |
| WO | WO 95/10782 | 4/1995 |
| WO | WO 01/06432 | 1/2001 |
| WO | WO 02/084309 | 10/2002 |

\* cited by examiner

*Primary Examiner*—Michael Nghiem
*Assistant Examiner*—Stephen J. Cherry
(74) *Attorney, Agent, or Firm*—Stites & Harbison PLLC; Ross F. Hunt, Jr.

(57) ABSTRACT

A meter for monitoring consumption of a resource, such as water or other fluids, and corresponding methods of configuring and operating the meter are disclosed. The meter includes processing and memory devices for determining and storing a supplier measure of consumption of the resource and a communication link for enabling a supplier to access the stored supplier measure. The supplier access is controlled by a first access control device, which prevents unauthorized access to the stored data. The meter further includes a consumer data memory for storing consumer data including a consumer measure of consumption and second access control device. The second access control device enables a consumer to access the stored consumer data without permitting the consumer to modify the stored supplier measure of consumption.

17 Claims, 1 Drawing Sheet

CONSUMPTION METER

Figure 1:
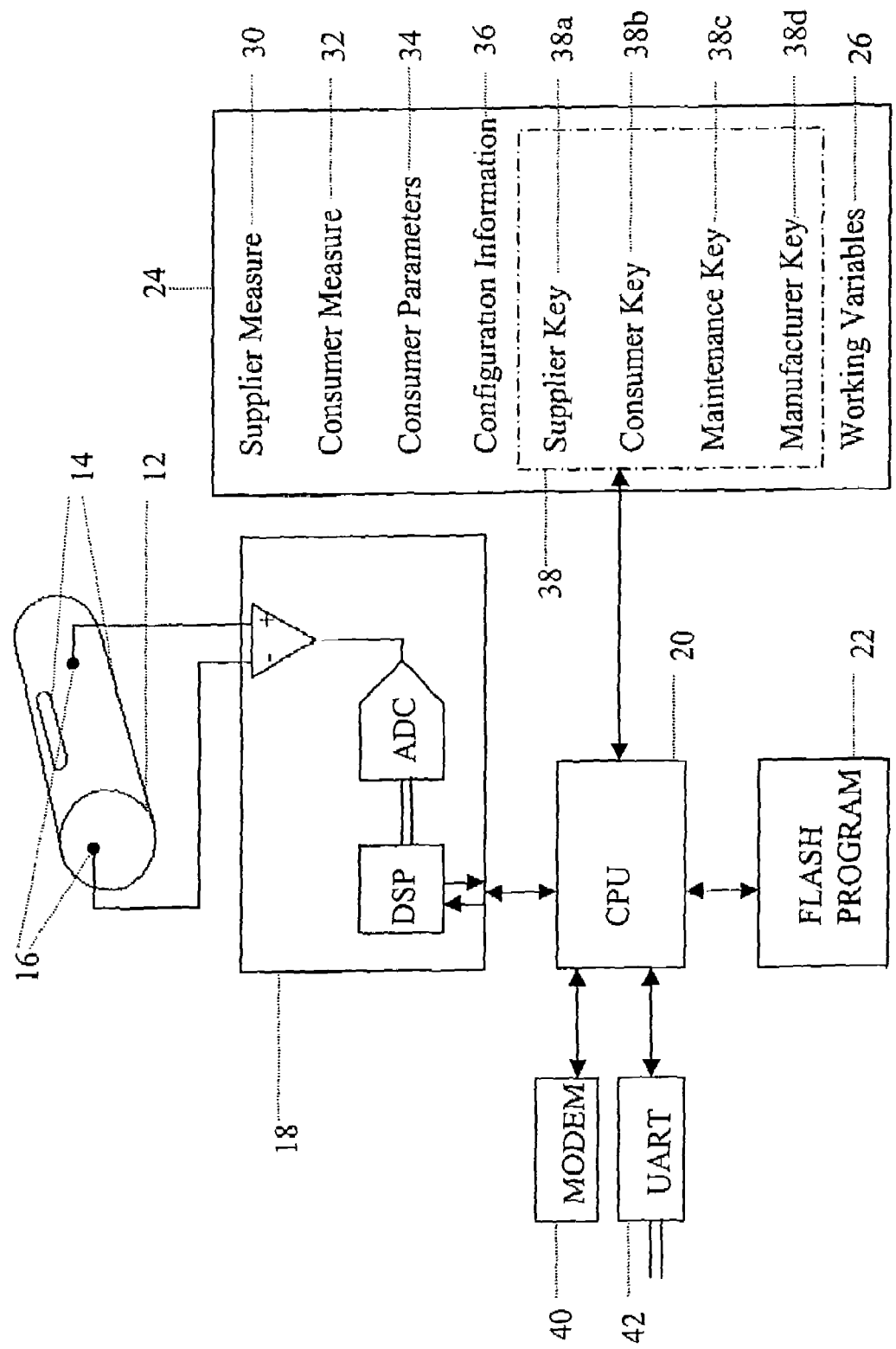

The present invention relates to meters for recording a supply of a resource from a supplier to a consumer. An embodiment of the invention is particularly concerned with fluid flow meters, particularly for measuring supply of water from a supplier to a consumer, although the principles may be applied more widely.

Whenever a supplier supplies something for which a charge is levied to a consumer, the supplier needs to have a reliable means for determining the quantity supplied. Since typically a supplier will supply multiple consumers via conduits which are at least partially shared, it is normal practice to place a meter at or adjacent the consumer premises. This principle is widely used for meters for example for water, gas and energy such as electricity and can also be used for oil and other substances.

Because the meter is located at the consumer premises, there needs to be a mechanism for the information from the meter to be transmitted to the supplier. In the past, this was often achieved by a supplier sending a representative physically to the location of the meter to read a register associated with the meter and communicating the information manually.

It is becoming increasingly common, however, for meters to be provided with a remote reading mechanism so that the information can be gathered more efficiently. The remote reading mechanism needs to be secure so that unscrupulous consumers or third parties cannot interfere with the data transmitted to the supplier. Often a two-way communication link is provided which enables the supplier to update parameters on the meter as well as to read the information stored in the meter.

There are often occasions where the consumer would also like to monitor usage of the substance or energy being supplied. The meters used by suppliers tend to be optimised for supplier requirements, typically monitoring bulk quantities over a period of time and particularly cumulative amounts rather than instantaneous rates and thus are often not suited to the needs of a consumer to monitor small variations in consumption. For this reason, a consumer who requires monitoring of consumption might have to provide a separate meter or meters downstream of the supplier's meter, optimised for monitoring of the property of consumption that the consumer is interested in. This of course requires a separate meter, with associated cost.

Many supplier meters have a visible output which can be used to monitor quantities consumed but the resolution of this is normally too small to be of much practical use to a consumer and it does not lend itself to automated input to a process. For vital security reasons, even where the meter is provided with remote access for the supplier, the supplier does not wish unauthorised parties (including the consumer) to have access to, and possibly corrupt, the sensitive stored data on consumption and thus security measures must be employed to restrict access to the stored data to the supplier.

It has been appreciated that in some cases the consumer might be able to make use of the metering information without interfering with the primary purpose of the meter which is to supply data reliably to the supplier. This is achieved by making available a low level electronic output, for example a pulse output, which the consumer can process with his or her own monitoring or logging equipment to monitor consumption based on the meter provided by the supplier.

A particularly useful application of this provision is in the case of monitoring of supply of water (or other fluids) where the monitoring of bulk supply to a process plant, particularly at a time where consumption is expected to be low or close to zero (for example at night) can be used to detect possible leaks. Products are available which are configurable by a consumer to input expected flow usages or to monitor flow usages and to detect possible leaks or to optimise consumption relying on a pulse signal input from an existing meter. However, whilst such products are useful, and do not require an additional metering body to be installed, they lack the flexibility of having a dedicated meter and also require installation additional to the installation of the supplier's meter.

The invention aims to provide an improved method and means for enabling a consumer to monitor consumption of a metered resource.

According to a first aspect, the invention provides a meter for monitoring consumption of a resource, the meter comprising:

processing and memory means for determining and storing a supplier measure of consumption of the resource;

a communication link for enabling a supplier to access the stored supplier measure under the control of a first access control means for preventing unauthorised access to the stored data, the meter further comprising:

consumer data memory for storing consumer data including a consumer measure of consumption and second access control means for enabling a consumer to access the stored consumer data without permitting the consumer to modify the stored supplier measure of consumption.

In this way the same metering assembly (preferably included in, preferably integrated with the apparatus) can be used by both the consumer and the supplier without compromising the integrity of the meter for the supplier and without requiring the consumer to provide a separate logging device. The consumer may access the data over the same communication link. The communication link may be a local link, e.g. IrDa, Bluetooth, IEEE 802.11, serial (e.g. RS232, USB) but may more preferably be a telecommunications link (such as a GSM or other cellular telecommunications link, such as a 3G link), or may be a wireless or wired connection to the Internet or similar communication medium.

The consumer measure may be derived from or may comprise (a copy of) the supplier measure or may be independently derived or simply scaled from the internal measurements derived by the processor.

In a highly preferred implementation, however, the consumer may configure measurement parameters and/or may measure consumption in units which are configurable and/or different to the supplier measurement units. Thus the consumer measure may preferably have smaller measurement units than the supplier measure. This may enable different types of readings to be obtained from the same meter by two different "users" of the meter.

In a highly preferred application, the consumer may configure logging parameters for a consumer log of consumption. For example, a consumer may configure start and/or end times for an independent log of cumulative consumption or may configure consumption conditions (for example time of day or rate of consumption) under which the log is to be operated or may simply reset an independent consumer log and read it as required. In this way, a consumer may monitor accumulated flow over a period of time or under certain conditions, for example at night, without having to monitor flow throughout the period externally of the meter. This may be used, particularly in the case of a fluid meter, to detect leaks.

Although the meter will normally record consumption for the supplier in relatively large units, for example units of 1000 litres or cubic metres for the supplier, the consumer may be provided access to a measurement with a higher resolution (smaller units), for example litres in a case of fluid flow. This may enable accurate detection of small leaks. For example, a flow of a few litres over the course of a night when a plant is not operating may be detected using units of litres whereas this would not normally be registered by the supplier units. For the consumer to detect this with his or her own separate meter would require a meter with high resolution and the ability to cope with the full flow rate, ie. similar properties to the supplier's meter and hence a similar cost to the supplier meter.

The meter may further comprise means for communicating a message from the consumer to the supplier or vice versa by means of the memory. The message may include one or more of a signalling of a potential fault, a request or notification of service, a warning message, or a user defined message. In this way, a message, for example indicating that the meter is potentially faulty may be left by the consumer for the supplier or vice versa and this may be automatically collected by the recipient when the recipient next communicates with the meter to obtain a reading.

In addition to consumer and supplier access to the meter, the meter may further provide service access under control of a third secure access means, the service access enabling a service operator to monitor and/or adjust configuration parameters of the meter and/or to reset or adjust meter readings. Preferably the service access affords access to parameters which are not adjustable by the supplier access or the consumer access. This may enable remote maintenance configuration and diagnosis of potential meter problems whilst avoiding inadvertent or unauthorised reconfiguration of the meter by the consumer (or by the supplier). The meter may include yet further factory calibration access under the control of further access means to enable factory calibration parameters to be configured. Either or both of the service access and factory access may be provided by the remote communication link and/or by a direct connection to the meter.

The meter may include means for notifying a consumer of an alarm condition. The means for notifying peferably includes means for providing a visual or audible indication locally connected to the meter and/or means for sending a message, preferably an SMS message to a remote destination. Typically, the alarm condition comprises a consumption in accordance with a predetermined condition configurable by the consumer, for example as discussed in more detail below.

In a first method aspect, the invention provides a method of configuring a meter having a metering assembly, a processor, memory and a communication link, the meter being configured to provide remote access to a stored supplier measure of consumption in the memory by an authorised supplier following supplier authentication, the method comprising configuring the meter to permit remote access to stored data including a consumer measure of consumption by a consumer following consumer authentication, wherein the consumer is not permitted to modify supplier measure stored in the memory.

Configuring may comprise updating software and may include configuring a portion of the memory as consumer data memory for storing consumer parameters.

In a further method aspect, the invention provides a method of operating a meter comprising:

determining and storing a supplier measure of consumption of the resource;

permitting a supplier to access the stored supplier measure under the control of a first access control means for preventing unauthorised access to the stored data, the method further comprising:

storing consumer data including a consumer measure of consumption; and permitting a consumer to access the stored consumer data without permitting the consumer to modify the stored supplier measure of consumption.

Preferred features of the apparatus aspects may be applied to the method aspects and vice versa.

The invention further extends to a computer program or computer program product or a downloaded or downloadable data packet for use in the above apparatus and method.

An embodiment of the invention will now be described, by way of example only, with reference to the accompanying drawing in which FIG. 1 is a schematic overview of a meter according to an embodiment of the invention.

The invention is described with the context of a fluid (water) meter as it finds particularly advantageous application and uses an electromagnetic flowmeter, a particularly convenient metering device as this can provide high resolution measurement, but it will be appreciated that another type of meter may be used when the same processing and access control mechanism.

Referring to FIG. 1, a meter comprises a metering body 10, in this case an electromagnetic flowmeter having a metering conduit 12, field generating coils 14 and flow sensing electrodes 16 coupled to processing circuitry 18. The processing circuitry 18 operates under the control of processor 20 which communicates with a stored program memory 22 which is non-volatile but preferably re-programable, for example flash memory.

The processor has working data memory 24 (which may be provided in the same physical memory as the stored program memory but may be in separate memory, preferably battery-backed or non-volatile). Either or both of the stored program memory 22 and the data memory 24 may in fact be provided on-board integrated with the processor 20; the physical arrangements are not germane to this invention.

Within the data memory 24 are defined (in addition to working memory 26 for the various processing operations) a supplier measure data area 30, and a consumer consumption measure store 32. Further included (optionally) is a consumer data memory area 34 for storing, for example, consumer preferences such as measurement units or configuration data. Also defined is a configuration parameters area 36. Further included is a password or access key area 38 containing a supplier access key 38a a consumer access key 38b, a maintenance access key 38c and a manufacturer access key 38d for permitting varying levels of access to the meter. A communication interface 40, typically comprising a wide area/telecommunications interface, here provided by a cellular modem (additionally or alternatively this may comprise a wireless or hard wired connection to a telecommunications network and/or the Internet, for example a cable or DSL modem), communicates with the processor 20 for receiving remote access communication connections. The term "cellular modem" is intended to include devices which may be configured as a dial up modem for a continuous data connection to one or more other computers or to an ISP or a GPRS connection to the Internet, or a device which simply exchanges messages (e.g. SMS messages). Communication may be effected simply by passing data in messages. The communication interface 40 may be a local access interface instead of a telecommunications interface. If, as here, a telecommunications interface is provided, there may also be provided (optionally) a local access communication interface 42. Any suitable interfaces may be used for a particular application. Suitable examples of local access communication interfaces may include, for example, a serial, USB, ethernet, infrared (IrDa), Bluetooth, IEEE 802.11, standard interface or a proprietary interface.

The operation of the meter will now be described, with reference to the following pseudo code which is given by way of non-limiting example:

Module: Measure
    At intervals (e.g. 1–10 seconds), obtain a measurement from the meter
    Optionally filter measurement
    Store new measurement in temporary store as latest measurement Module: Log
    Read new measurements produced by module 1
    Read supplier logging parameters, including measurement frequency and target units
    Based on supplier logging parameters, store measure in supplier store
    Read consumer logging parameters, including measurement frequency and target units
    Based on consumer logging parameters, store measure in consumer store
    Update totals according to program
    Update historical data of consumption
    Optionally, check for alarm condition Module: Communication
    Receive communication access request
    Obtain user id and password
    Verify user id and password
    Case Supplier->set access rights to supplier data area
    Case Consumer->set access rights to consumer data area
    Case Technician->set access rights to configuration data area, enable software
upload
    Case Manufacturer->set access rights to all data, enable software upload
    Receive communication requests, verify access rights, and process requests until user logs off
    Optionally, log communication session and/or failed access attempts Module: Alarm
    Compare updated measures to alarm criteria
    If Alarm condition detected:
        Trigger audio/visual local alert
        Send SMS message to stored number
        Log Alarm details in consumer data area The processor controls the processing circuitry and components of the meter in a conventional manner to derive a measurement of flow. These details are not germane to the invention and will not be described in detail. Under control of configuration parameters, the internal measurement of flow is calibrated into appropriate units and stored in the supplier measure area 30. Based on the consumer profile information stored in consumer data area 34, a further measure in the consumer's selected units (typically smaller than the supplier units) is stored in the consumer data area 32. In simplified embodiments, a consumer may simply be provided with read access to a single measure stored for both the supplier and consumer. On receipt of the communication via the remote communication device (e.g. GSM modem) 40, the processor validates an incoming caller, optionally with reference to the line identifier of the caller in addition to or instead of the stored access keys 38*a*, 38*b*, 38*c*, 38*d* and affords access to the appropriate data in the memory.

Optionally, the manufacturer or maintenance key may enable the stored program in stored program memory 22 to be updated or a new program downloaded in addition to access to the data areas noted. Additional features may be provided or features may be modified as desired dependent on the application.

The meter may provide analysis of consumption and/or alarms in a variety of ways, as will now be described. The precise features used may be selected individually or in combination according to the application and likely or actual consumption. Although reference is made to detecting excess consumption as this will typically be of concern, in certain cases the meter may be configured (additionally or alternatively) to detect unusually small consumption (for example in an irrigation application, this may indicate failure or blockage of a valve).

The meter may be configurable to provide an alarm output when consumption exceeds a pre-set amount. The pre-set amount may be configurable by the consumer. The alarm may be signalled directly, for example audibly or visibly and/or communicated remotely to the user. When an alarm is triggered, the meter may be arranged to communicate directly with the consumer, for example by sending a message, rather than waiting for the alarm log to be interrogated by the consumer. The meter may include means for determining typical consumption based on historical data, and means for detecting a departure from typical consumption. Preferably the meter has means for logging consumption in each of a plurality of time intervals. Preferably the meter has means for storing at least two time intervals (typically morning and night) for each day of the week, preferably at least 4 time intervals per day and for recording consumption for each interval. Preferably the start and end times of each interval are configurable. The intervals are preferably not constrained to be equal.

Preferably the meter has means for detecting consumption which exceeds average consumption by a given, preferably configurable, relative and/or absolute amount (for example greater than 10% and/or exceeds average by 1000 litres). Preferably the meter has means for performing statistical analysis of the consumption and deriving a measure of variation and determining an excess consumption based on the measure of variation (for example consumption exceeding the mean by more than one standard deviation).

Although the logging and alarm functions are preferably provided on the meter, more detailed analysis may be provided remotely, and implemented by the consumer running an application that regularly communicates with the meter.

The distribution of analysis between the meter and the consumer may be selected as appropriate and may vary greatly. At one extreme, the consumer may run an application which regularly reads the meter consumption and performs remote analysis. More preferably, the consumer may configure logging parameters and set thresholds for alarms (for example automatically sent by the meter by way of an SMS, preferably to a consumer-configurable destination(s)) and then, in an extreme case, may not need to read the consumption or interact with the meter again until the meter sends an alarm signal or the desired logging parameters change.

It should be noted that, although the invention is applicable to "consumers" and "suppliers" who are typically separate entities in which supply of the resource corresponds to a commercial transaction and the meter is located at an interface between the two, the invention is more generally applicable to the case of supply of a resource and the consumers and suppliers who interrogate the meter might, for example, simply be elements of a process control program for a process plant which have independent requirements for a measure of consumption of a resource.

The invention claimed is:

1. A meter for monitoring consumption of a resource, the meter comprising:
   processing and memory means for determining and storing a supplier measure of consumption of the resource;
   a communication link for enabling a supplier to access the stored supplier measure under the control of a first access control means for preventing unauthorised access to the stored data, the meter further comprising:
   consumer data memory for storing consumer data including a consumer measure of consumption; and
   second access control means for enabling a consumer to access the stored consumer data without permitting the consumer to modify the stored supplier measure of consumption;
   wherein the meter is arranged to store consumer configuration data.

2. A meter according to claim 1 further including a metering assembly providing output signals indicative of consumption to the processing means.

3. A meter according to claim 2 wherein the meter is integrated with the metering assembly.

4. A meter according to claim 1 arranged to permit the consumer to access the data over the same communication link as the supplier.

5. A meter according to claim 1 wherein the communication link comprises a telecommunications link.

6. A meter according to claim 1 wherein the processor is arranged to enable the consumer measure to have different resolution or measurement units to the supplier measure.

7. A meter according to claim 1 wherein the processor is arranged to maintain a consumer log of consumption for access by the consumer.

8. A meter according to claim 1 further comprising means for communicating a message from the consumer to the supplier or vice versa.

9. A meter according to claim 1 further arranged to provide service access under control of a third secure access means, the service access enabling access to parameters which are not adjustable by the supplier access or the consumer access.

10. A meter according to claim 1 arranged to monitor fluid flow, wherein the consumer measure is arranged to permit detection of leaks.

11. A meter according to claim 1 including means for notifying a consumer of an alarm condition.

12. A meter according to claim 11, wherein the means for notifying includes means for providing a visual or audible indication locally connected to the meter.

13. A meter according to claim 11, wherein the means for notifying includes means for sending a message, preferably an SMS message to a remote destination.

14. A meter according to claim 11, wherein the alarm condition comprises a consumption in accordance with a predetermined condition configurable by the consumer.

15. A meter for monitoring consumption of a resource, the meter comprising:
   processing and memory means for determining and storing a supplier measure of consumption of the resource;
   a communication link for enabling a supplier to access the stored supplier measure under the control of a first access control means for preventing unauthorised access to the stored data, the meter further comprising:
   consumer data memory for storing consumer data including a consumer measured of consumption; and
   second access control means for enabling a consumer to access the stored consumer data without permitting the consumer to modify the stored supplier measure of consumption;
   wherein the meter is further arranged to provide service access under control of a third secure access means, the service access enabling access to parameters which are not adjustable by the supplier access or the consumer access.

16. A meter for monitoring consumption of a resource, the meter comprising:
   processing and memory means for determining and storing a supplier measure of consumption of the resource;
   a communication link for enabling a supplier to access the stored supplier measure under the control of a first access control means for preventing unauthorised access to the stored data, the meter further comprising:
   consumer data memory for storing consumer data including a consumer measure of consumption;
   second access control means for enabling a consumer to access the stored consumer data without permitting the consumer to modify the stored supplier measure of consumption; and
   means for notifying a consumer of an alarm condition wherein the alarm condition comprises a consumption in accordance with a predetermined condition configurable by the consumer.

17. A method of configuring a meter having a metering assembly, a processor, memory and a communication link, the meter being configured to provide remote access to a stored supplier measure of consumption in the memory by an authorised supplier following supplier authentication, the method comprising configuring the meter to permit remote access to stored data including a consumer measure of consumption by a consumer following consumer authentication, wherein the consumer is not permitted to modify the supplier measure stored in the memory and wherein configuring comprises updating the software of the meter.

* * * * *